UNITED STATES PATENT OFFICE 2,513,313

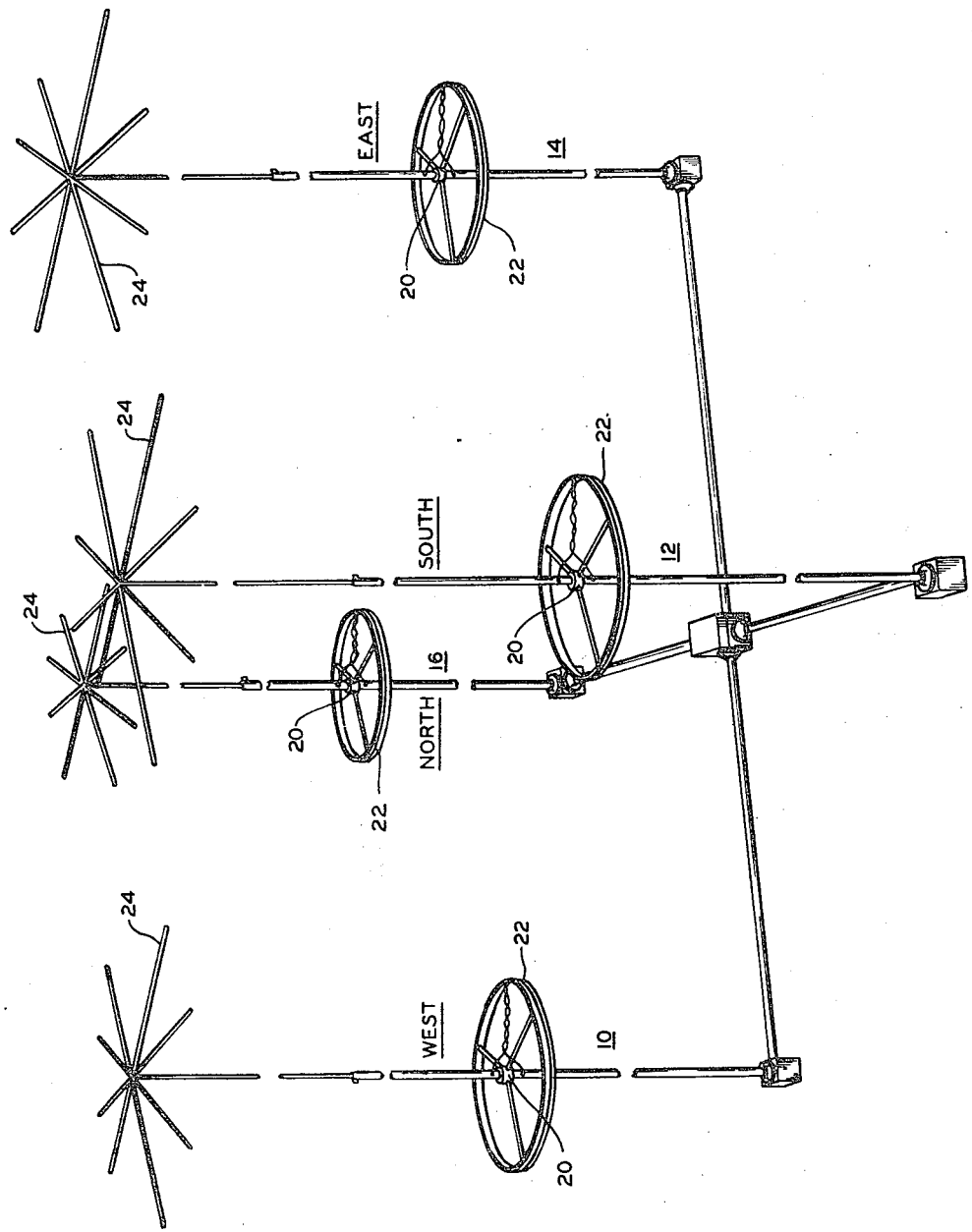
INVENTOR.
PAUL G. HANSEL

ANTENNA SYSTEM

Paul G. Hansel, Red Bank, N. J.

Application August 1, 1945, Serial No. 608,344

22 Claims. (Cl. 343—113)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to radio direction finders and is particularly directed to improvements in spaced-aerial antenna systems associated with radio direction finders.

One of the objects of my invention is to enhance the accuracy and reliability of radio direction finding on waves characterized by abnormal or complex polarization.

Another object of my invention is to provide improved spaced-aerial antenna systems for radio direction finders of such novel design that said antenna systems are largely free from "polarization effects," i. e., polarization fading, polarization errors and polarization-selective site errors.

Still another object is to increase the effective signal sensitivity of radio direction finders by utilizing the horizontally-polarized components of the received wave as well as the vertically-polarized components of said wave.

It is well known that the accuracy and reliability of short-wave radio direction finding are limited to a greater extent by "unfavorable" polarization characteristics of the waves received by the direction finding antenna than by any other single instrumental or propagational factor. The so-called "night effect" belongs to a general class of direction-finding phenomena which may be called "polarization effects." The "polarization effects" include fading of signal strength due to changing polarization, persistent bearing errors due to constant but "unfavorable" polarization, and instrumental, site and path errors which vary in magnitude as the polarization of the received wave changes.

Loop-antenna direction finders are notoriously susceptible to polarization errors. Until recently it was believed that Adcock antenna systems and other direction finding antenna systems employing spaced vertical aerials as collector elements were largely free from polarization errors. However, recent investigations have shown that, even with the most carefully-designed spaced-aerial direction finders, cyclic fading of signal strength and wandering of the indicated bearings are common in direction finding on steeply-incident waves returned from the ionosphere and waves received directly from aircraft transmitters. Further studies have also shown that these phenomena are almost invariably associated with changing polarization.

Now, since almost all direction finding antennas of the prior art were designed to be primarily responsive to vertically-polarized waves, it has become customary to regard the energy contained in the horizontally-polarized components of a down-coming wave as inherently troublesome and therefore "unwanted." Designers of spaced-aerial direction finders have gone to great lengths to prevent pickup of horizontally-polarized energy and several ingenious schemes have been proposed to neutralize or balance out the signal voltages induced in the antenna system by the horizontally-polarized components of the received wave. However, most of these schemes have been unworkable because of the inconstant polarization characteristics of the waves encountered in practice.

This invention is based upon a different concept of the character of the horizontally-polarized component. The horizontally-polarized component is no longer regarded as inherently troublesome and therefore entirely "unwanted." Instead, the horizontally-polarized component is regarded as useful or "wanted" when it is picked up where it is wanted, and harmful or "unwanted" when it is picked up where it is not wanted.

In essence then, this invention consists of enhancing the wanted horizontally-polarized energy pickup to such an extent that the unwanted horizontally-polarized energy pickup is too small by comparison to affect the accuracy of direction finding. No deliberate attempt is made to reduce the absolute amount of unwanted pickup of horizontally-polarized energy.

For a better understanding of the invention, together with other and further objects thereof, reference is had to the following description taken in connection with the single figure of the accompanying drawing, which shows a perspective view of the invention.

In the drawing, there are shown four omnidirectional aerial elements 10, 12, 14, and 16 of a spaced-aerial direction finder, each aerial being situated at the corner of a square. As is conventional, the aerials are associated in pairs, i. e., the north aerial 16 and the south aerial 12 constitute one differentially-connected pair, while the east aerial 14 and the west aerial 10 constitute another such pair. The manner in which these aerials may be connected to the direction finding receiver and indicator to present bearing intelligence is well known and, therefore, need not be described in detail. Conventional spaced-aerial direction finders are fully described in "Wireless Direction Finding" by R. Keen, 3rd ed., London (1938). The invention is also applicable to the type of direction finder disclosed in my copending application, entitled "Radio Direction Finder" Serial No. 541,950, filed June 24, 1944, U. S. Patent No. 2,476,977, issued July 26, 1949, the disclosure of which is hereby made a part of this application. Said disclosure has also been published in "Electronics" April 1948, page 86. The invention is, however, equally applicable to all such systems regardless of the specific direction finding method used.

In considering the prior systems of this type, assume a vertically-polarized plane wave arriving from a due-east direction. The signal voltage induced in the north antenna 16 will be in phase with that induced in the south antenna 12, and the output of the north-south pair will be zero or, as it is conventionally stated, a "null" will be obtained from the north-south pair. This is true because of the differential connection.

Because of the time required for the wave to travel from the east antenna 14 to the west antenna 10, there will be a phase difference $\phi$ between the voltages induced in the east and west aerials, as follows:

$$\phi = \frac{2\pi d}{\lambda} \sin \theta \qquad (1)$$

where:

$\theta$ = angle of vertical incidence,
$\lambda$ = wavelength, and
$d$ = spacing between aerials.

The output from the east-west pair is the vector difference between the voltages induced in the east and west aerials. This output, for the direction of arrival shown, is the entire "wanted" output of the antenna system and will produce an error-free indication of bearing.

Next, consider the conditions which exist when the received wave contains only a horizontally-polarized component. At first glance it would appear that the output of each vertical aerial should be zero and that no bearing indication at all should be obtained. However, experience shows that, even with the most carefully arranged vertical-aerial antenna system, residual responses exist when the received wave is purely horizontally polarized. These residual responses have been found to produce an erroneous bearing indication. The actual bearing error $\epsilon$ for a due east direction of arrival, is:

$$\epsilon = \tan^{-1} \frac{R_{n/s}}{R_{e/w}} \qquad (2)$$

where:

$R_{n/s}$ = residual response of the north-south pair, $R_{e/w}$ = residual response of the east-west pair.

This is therefore a case wherein two residual responses are obtained when the wave is horizontally-polarized, one of which, $R_{n/s}$, is "unwanted," and another, $R_{e/w}$, which is "wanted." $R_{n/s}$ is unwanted because the error increases as $R_{n/s}$ increases. $R_{e/w}$ is, in this case, a wanted component because the error decreases as $R_{e/w}$ increases.

All of the mechanisms through which these residual responses are produced have not been definitely established. However, it is reasonably certain that they are produced by vertically-polarized secondary fields. For example, an oblique conductor near the direction finder can abstract energy from a horizontally-polarized primary field and can reradiate a secondary field with vertically-polarized components. Such an oblique conductor might be said to produce a polarization-selective site error. Ground currents may also give rise to residual responses. For example, a downcoming horizontally-polarized wave can induce an E. M. F. in the ground or counterpoise system which will give rise to ground currents. These currents can set up secondary fields which have vertical components of electric intensity.

For the case above described, the secondary fields due to ground currents have a phase difference of substantially 180 degrees between the north and south aerials. The secondary-field phase difference between the east and west aerials is only approximately $\phi$, as defined by Equation 1. Obviously then, the north/south residual component $R_{n/s}$ will be considerably larger than the east/west residual $R_{e/w}$ and the error as defined by Equation 2 will be large.

From Equation 2 it is apparent that the bearing error on a horizontally-polarized wave can be made small by making the ratio of wanted to unwanted pickup high. For example, when the ratio of wanted to unwanted pickup exceeds 60 to 1, the bearing error will be less than one degree.

In accordance with this invention, the ratio of wanted to unwanted signal pickup is increased by replacing the conventional vertical aerials with "loop-vertical" aerials. Each of said loop-vertical aerials is formed by inserting an insulating coupling 20 in which each vertical aerial, mounting a horizontal loop antenna 22 at each of said points, and connecting said loop antennas in series with the two portions of said vertical aerials. For optimum results, the effective height of the loop should be equal to the effective height of the vertical aerial, although in practise beneficial results will be obtained for much lower effective loop heights. A top-loading skirt 24 is also mounted on the top of each aerial for increasing the effectiveness of both the horizontal loop and the vertical aerial, although this feature is not absolutely essential.

For the case of due east arrival, the additional signal contributed by the north and south loops will be in phase and will cancel out because of the conventional differential connection. Consequently $R_{n/s}$ will not be increased. On the other hand, the additional signal contributed by the east and west loops will differ in phase by $\phi$ as defined by Equation 1 and the vector difference between the east and west loop signals, which may be designated by $E_L$, will be large compared to $R_{n/s}$.

The wanted signal will now consist of a very small signal $R_{e/w}$ induced in the east and west vertical aerials by secondary fields and a relatively large signal $E_L$ induced in the loops by the horizontally-polarized primary field. The unwanted signal $R_{n/s}$ will still be derived solely from a vertically-polarized secondary field which is weak relative to the horizontally-polarized primary field. Consequently the bearing error will be small because the ratio of $R_{n/s}$ to $R_{e/w}$ plus $E_L$ will be small.

Although, in the foregoing, only the case of a due-east direction of arrival was considered to simplify the analysis, the improvement provided by this invention is perfectly general regardless of the actual direction of arrival.

The foregoing analysis is also restricted, for simplicity, to the reception of linearly-polarized waves with either a vertical or horizontal orientation of the electric vector. However, although a radio wave is usually emitted as a single linearly-polarized ray, waves returned from the ionosphere almost always are characterized by complex and changing polarization.

Ionospheric waves received in the northern hemisphere are likely to be elliptically or circularly-polarized with a left-handed sense of rotation. In the southern hemisphere ionospheric waves are more likely to be elliptically or circularly-polarized with a right-handed sense of rotation. It is necessary therefore to examine the receiving properties of the loop-vertical aerials. First, it should be noted that the voltage induced in each vertical aerial will be substantially cophasal with the vertically-polarized component of the received wave. The voltage induced in horizontal loop will be substantially in phase quadrature with the horizontally-polarized component. Therefore, for all possible orientations of the electric vector in the case of a linearly polarized wave, the loop and vertical voltages will add to produce an output greater than the output of either collector considered individually. This is true regardless of the relative effective heights of the loops and the vertical aerials and regardless of the sense in which the loops and vertical aerials are connected in series.

If, however, the received wave is circularly or elliptically polarized, the loop and vertical voltages may add for one manner of connection and subtract for the other connection. In the northern hemisphere the loop and vertical collectors should be connected to produce maximum output for circularly-polarized waves with a left-handed sense of rotation. The connections should be reversed for operation in the southern hemisphere. Direction finders which are to operate in both hemispheres should, therefore, be provided with a convenient terminal or switching arrangement to facilitate effective reversal of the leads from the loop antenna.

The horizontal loop represents the most convenient means for increasing the ratio of wanted to unwanted pickup of horizontally-polarized energy. Other means may of course be employed. For example, horizontal dipoles could be used in the familiar turnstile arrangement. Properly-oriented vertical loops or horizontal dipoles might also be used. More elaborate arrangements may also be employed to combine the signals from the horizontal and vertical collector elements. Under certain circumstances it might be convenient, for example, to employ coupling networks such as cathode followers, phasing networks or coupling transformers instead of the simple series connection shown here.

It should also be noted that this invention may be applied to other forms of direction finding antennas as well as the four-element form illustrated in the drawing. The invention is, of course, readily applicable to the rotating two-element forms of the Adcock antenna.

When a direction finder is provided with a spaced-aerial antenna system embodying this invention, sense-finding can be accomplished in the usual manner. If an auxiliary sense antenna is provided it should include means for abstracting horizontally-polarized energy. The ratio of horizontal to vertical energy pickup should be made approximately equal to that of each of the spaced aerials used for direction finding.

While a particular embodiment of this invention has been described for purposes of illustration, it will be understood that various modifications and adaptations thereof may be made within the spirit of the invention as set forth in the appended claims.

I claim:

1. A directional antenna system comprising a plurality of spaced, similarly-oriented wave collectors, each of said wave collectors including an element responsive to vertically-polarized wave energy and an element responsive to horizontally-polarized wave energy, and means for additively combining the output of said elements vectorially to produce a resultant output from each of said spaced wave collectors which is greater in magnitude than the output of either of said collector elements considered individually.

2. A directional antenna system comprising a plurality of spaced, similarly-oriented wave collectors, each of said wave collectors including an element for deriving a signal from the vertically-polarized component of the received wave energy which is substantially cophasal with said vertically-polarized component and an element for deriving a signal from the horizontally-polarized component of said received wave energy which is substantially in phase quadrature with said horizontally-polarized component, and means for additively combining vectorially the signals so derived to obtain from each of said spaced wave collectors a resultant signal having a magnitude which is greater than the magnitude of either of said signals individually.

3. A direction-finding antenna system comprising a plurality of spaced, similarly-oriented wave collectors, each of said wave collectors including a vertical element and a horizontal loop-type element, and means for combining in an additive manner the output of said vertical collector element with the output of said horizontal loop-type collector element.

4. In a direction-finding system employing an antenna system comprised of a plurality of spaced wave collectors responsive primarily to the vertically-polarized component of a received wave, the method of reducing polarization errors which comprises deriving a signal from the horizontally-polarized components of the received wave at each of a plurality of spaced points, and combining additively the signals so derived with the output of said antenna system in such phase relation that the resultant wanted energy pickup of said antenna system is effectively increased.

5. A directional antenna system comprising at least a pair of spaced, differentially-connected wave collectors, each wave collector comprising a linear conductor element and a loop element disposed in a plane perpendicular to said conductor, and means for combining the signals from said elements to derive a resultant signal from each wave collector which is greater than the signal derived from each element.

6. A system as set forth in claim 5, wherein both elements of each wave collecter have equal effective heights.

7. A directional antenna system comprising at least a pair of physically spaced and differentially connected wave collectors, each wave collector comprising a vertical linear conductor element and a horizontal loop element, said elements being connected in series to derive a resultant signal which is greater than the signal derived from each element.

8. A directional antenna system comprising at least a pair of physically spaced and differentially connected wave collectors, each wave collector comprising a linear conductor and a loop disposed in a plane perpendicular to said conductor, said loop being connected in series with said conductor at an intermediate point thereof to derive a signal which is greater than the individual signals from said loop and conductor.

9. A system as set forth in claim 8, wherein said conductor and loop have equal effective heights.

10. A system as set forth in claim 8, including a loading skirt on each wave collector.

11. A directional antenna system comprising a plurality of spaced wave collectors each of which includes first and second elements responsive respectively to vertically-polarized and horizontally-polarized wave energy, the first elements of all collectors having identical directivity patterns which are identically oriented and the second elements of all wave collectors having identical directivity patterns which are identically oriented, means for combining the outputs of the first and second element of each wave collector to produce a resultant output from said wave collector which is greater in magnitude than the output of either of said elements considered individually, and means for combining said resultant outputs to derive a direction-dependent signal.

12. A directional antenna system comprising a plurality of spaced wave collectors each of which includes first and second elements responsive respectively to vertically-polarized and horizontally-polarized wave energy, the first elements of all collectors having identical horizontal directivity patterns which are identically oriented and the second elements of all wave collectors having identical horizontal directivity patterns which are identically oriented, means for combining the outputs in the first and second element of each wave collector to produce a resultant output from said wave collector which is greater in magnitude than the output of either of said elements considered individually, and means for combining said resultant outputs to derive a direction-dependent signal.

13. The method of determining the direction of arrival of a wave comprising: deriving from each of a plurality of spaced points a first signal which is substantially cophasal with a component of said wave which is polarized in one plane, deriving from each of said points a second signal which is substantially in quadrature with another component of said wave which is polarized in a plane perpendicular to said one plane, combining the first and second signal received at each point to produce a resultant signal which is of greater magnitude than either signal considered individually, and combining the resultant signals derived from said points to produce a direction-dependent wave.

14. The method of determining the direction of arrival of a wave which comprises: deriving a first signal from the vertically-polarized component of said wave from each of a pair of spaced points, deriving from each of said points a second signal from the horizontally-polarized component of said wave, combining the first and second signal derived from each point to produce a resultant signal which is of greater magnitude than either signal considered individually, and combining the resultant signals derived from said points to produce a direction-dependent signal.

15. The method of determining the direction of arrival of a wave which comprises: deriving a first signal which is substantially cophasal with the vertically-polarized component of said wave from each of a pair of points, deriving from each of said points a second signal which is substantially in quadrature with the horizontally-polarized component of said wave, combining the first and second signal derived from each point to produce a resultant signal which is of greater magnitude than either signal considered individually, and differentially combining the resultant signals derived from spaced points to produce a direction-dependent signal.

16. The method of determining the direction of arrival of a wave which comprises: deriving a first signal which is substantially cophasal with the vertically-polarized component of said wave from each of an even number of points equally spaced along the circumference of a circle, deriving from each of said points a second signal which is substantially in quadrature with the horizontally-polarized component of said wave, combining the first and second signal derived from each point to produce a resultant signal which is of greater magnitude than either signal considered individually, differentially combining the resultant signals derived from diagonally-spaced points, and combining all said differentially-combined signals to produce a direction-dependent signal.

17. In a system for determining the direction of arrival of a wave in which a group of signals are derived from a plurality of spaced points from the vertically-polarized component of said wave and combined to produce a resultant, direction-dependent signal; the method of reducing the effect of the polarization-error component of said signals which comprises: deriving an auxiliary signal from the horizontally-polarized component of said wave, and so combining said auxiliary signal with said group of signals that the magnitude of said signal is increased.

18. In a system for determining the direction of arrival of a wave in which a first group of signals, each of which is substantially cophasal with the vertically-polarized component of said wave, are derived at a plurality of spaced points and combined to produce a resultant, direction-dependent signal; the method of reducing the effect of the polarization-error component of said signals which comprises: deriving an auxiliary signal which is substantially in phase quadrature with the horizontally-polarized component of said wave, the magnitude of said auxiliary signal being substantially greater than that of said polarization-error component, and so combining said auxiliary signal with said group of signals that the magnitude of said resultant signal is increased.

19. In a system for determining the direction of arrival of a wave in which a first group of signals, each of which is substantially cophasal with the vertically-polarized component of said wave, are derived from a plurality of spaced points and combined to produce a resultant, direction-dependent signal; the method of reducing the effect of the polarization-error component of said signals which comprises: deriving at each of said points a second group of signals each of which is substantially in phase quadrature with the horizontally-polarized component of said wave, the magnitude of each of said second group of signals being substantially greater than that of said polarization-error component, and so combining said first and second groups of signals that the magnitude of said resultant signal is increased.

20. In a system for determining the direction of arrival of a wave in which a first group of signals are derived from a plurality of spaced points due to the vertically-polarized component of said wave; the method of reducing the effect of the polarization-error component of said signals which comprises: deriving a second group of signals from a number of spaced points due to the horizontally-polarized component of said wave, the magnitude of each of said second group of signals being greater than that of said polarization-error component, and combining said first and second groups of signals to produce a resultant, direction-dependent signal.

21. In a system for determining the direction of arrival of a wave in which a first group of signals, each of which is substantially cophasal with the vertically-polarized component of said wave, are derived at a plurality of spaced points; the method of reducing the effect of the polarization-error component of said signals which comprises: deriving from a like number of spaced points a second group of signals, each of which is substantially in phase quadrature with the horizontally-polarized component of said wave, the magnitude of each of said second group of signals being substantially greater than that of said polarization-error component, and combining said first and second groups of signals to produce a resultant, direction-dependent signal.

22. In a system for determining the direction of arrival of a wave in which a first group of signals, each of which is substantially cophasal with the vertically-polarized component of said wave, are derived at a plurality of spaced points; the method of reducing the effect of the polarization-error component of said signal which comprises: deriving from each of said points a second group of signals each of which is substantially in phase quadrature with the horizontally-polarized component of said wave, the magnitude of each of said second group of signals being substantially greater than that of said polarization-error component, and combining said first and second groups of signals to produce a resultant, direction-dependent signal.

PAUL G. HANSEL.

REFERENCES CITED

The following references are of record in the file of this patent:

UNITED STATES PATENTS

| Number | Name | Date |
| --- | --- | --- |
| 1,546,731 | Herzog | July 21, 1925 |
| 1,597,848 | Weagant | Aug. 31, 1926 |
| 2,095,078 | Peterson | Oct. 5, 1937 |
| 2,174,016 | Sullinger | Sept. 26, 1939 |
| 2,202,400 | Roberts | May 28, 1940 |
| 2,256,619 | Luck | Sept. 23, 1941 |
| 2,282,030 | Busignies | May 9, 1942 |
| 2,422,108 | Luck | June 10, 1947 |

OTHER REFERENCES

Wireless Direction Finding, R. Keen, 3rd ed., London (1938).